Figure 1:
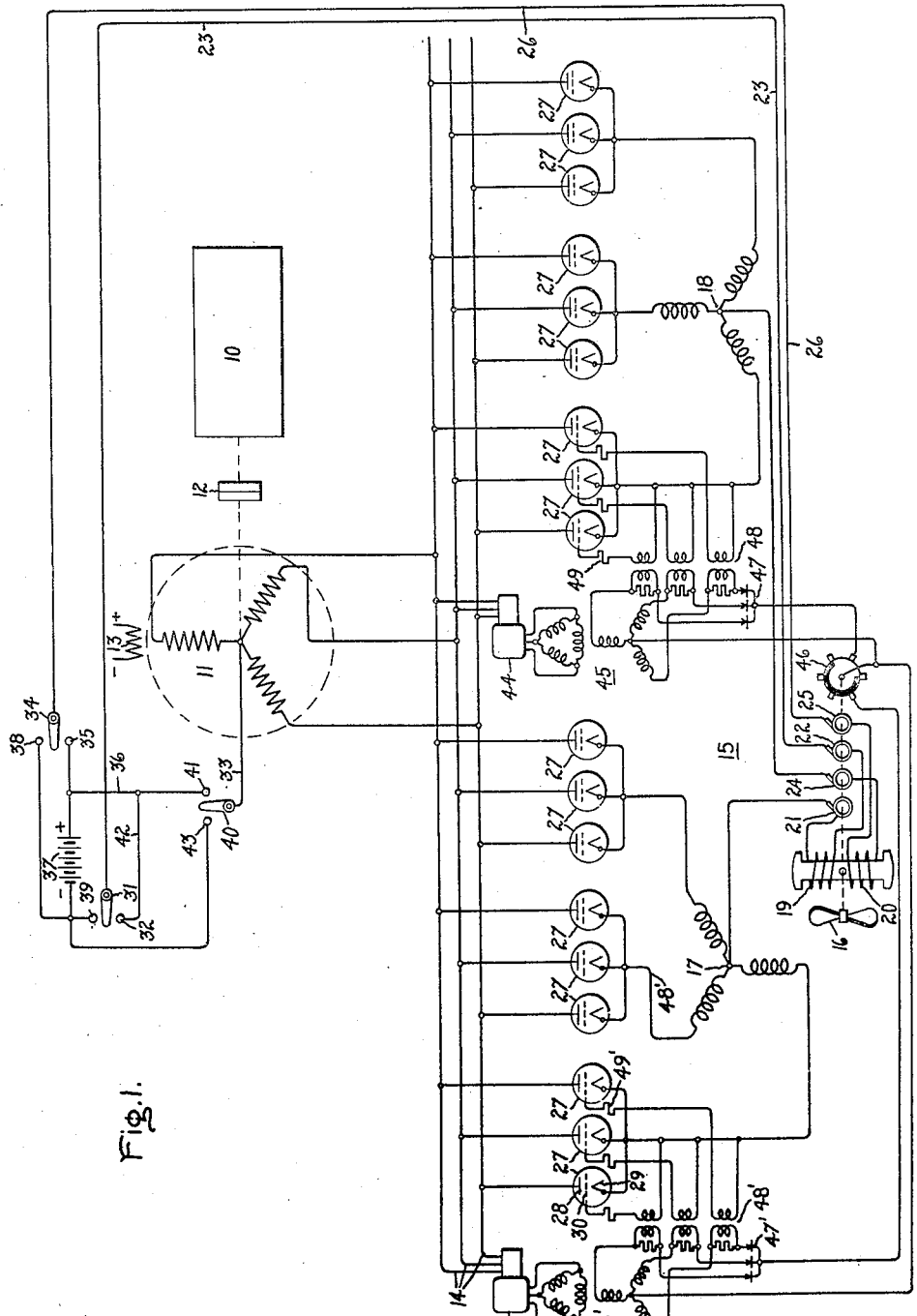

Patented Apr. 8, 1941

2,237,384

UNITED STATES PATENT OFFICE 2,237,384

ELECTRIC POWER SYSTEM

Ernst F. W. Alexanderson, Schenectady, N. Y., assignor to General Electric Company, a corporation of New York Application April 26, 1939, Serial No. 270,186

27 Claims. (Cl. 172—237)

My invention relates to electric power systems, and more particularly to systems wherein electric motors of the alternating current type are energized through electronic means from a plurality of sources of different forms of current.

In order to illustrate my invention I will describe suitable apparatus and methods of operation thereof for carrying it into effect in an electric submarine propulsion system. It is, of course, understood that the scope of my invention is not limited to the particular application described, but rather is of general application wherever it is desired to operate an electric motor or motors energized through electronic means from a plurality of sources of different forms of current for operating any vessel, locomotive, vehicle or other apparatus.

In an electric power system for propelling submarines it is necessary to provide power both for surface and submerged operation, and in both of these situations it is desired that variable speeds of propulsion may be obtained. In electric submarine or ship propulsion difficulties have been encountered in obtaining a satisfactory variable speed motor which is simple and of economical design. Originally, the series direct current motor was used because of the complete variability of speed. Later it was discovered that the variable speed characteristics of the direct current series motor could be retained with alternating current machines without sacrificing the economy of alternating current motor design. Such variable speed electric motors to be adaptable for submarine propulsion should be capable of being supplied from different sources of power since for submerged operation it is not practical to derive power from conventional prime movers, such as Diesel engines, turbines and the like where the exhaust gases or exhaust steam would disclose the presence of the submarine to any observer on the surface of the water. For submerged operation, therefore, it is desirable to drive the submarine by means of a source of power such as a battery or other electrical energy storage means which will in no way disclose the presence of the submarine to an observer on the surface of the water. It would be desirable, therefore, to provide an alternating current motor having the variable speed characteristics of a direct current series motor which may be supplied with energy either from a battery or from the conventional alternating current generator driven from a suitable prime mover. The battery would be designed to supply a voltage substantially equal to the counter-electromotive force of the submarine driving motor when operating at full speed. However, since the counter-electromotive force of the motor is proportional to the speed of rotation, when the submarine operates submerged at reduced speed the battery voltage would then exceed the motor counter-electromotive force and it becomes necessary to dispose of or utilize the excess battery voltage and corresponding excess energy. It has been suggested to use a resistance to absorb the excess energy, but this of course is wasteful of power. Accordingly, I provide an electric power system for a submarine wherein a battery supplies the energy to the driving motor for submerged operation and wherein variable speed of the motor may be obtained without wasting any substantial amount of the battery energy.

It is an object of my invention to overcome the disadvantages above noted in connection with electric power systems where a plurality of sources of power of different forms of current are used to supply energy to a variable speed motor of the alternating current type through a plurality of discharge valves.

It is another object of my invention to provide a new and improved electric power system.

It is another object of my invention to provide a new and improved electric power system comprising a plurality of different sources of power for supplying a variable speed motor of the alternating current type through electronic means.

It is a further object of my invention to provide a new and improved electric power system for submarine propulsion which combines the complete variability of speed found in direct current drives with the economy of synchronous motor design, and which will operate satisfactorily either during surface or submerged operation of the submarine.

It is a still further object of my invention to provide a new and improved electric power system wherein a battery or an alternating current generator supplies energy through electronic means to a variable speed motor of the alternating current type.

It is another object of my invention to provide a new and improved motor of the variable speed alternating current type energized from a source of electrical energy through electronic means.

It is another object of my invention to provide a new and improved electric power system for submarines wherein a battery supplies the driving power for submerged operation and an alternating current generator driven by a suitable prime mover supplies the power for surface operation and wherein variable speed submerged operation may be obtained with substantially no waste of the battery energy.

It is another object of my invention to provide a new and improved electric power system for submarine propulsion wherein the submarine driving motors may be supplied either from a battery or an alternating current generator and wherein suitable means are provided for returning any excess energy to the battery when it is supplying power for submerged operation.

It is another object of my invention to provide a new and improved electric power system wherein an alternating current motor is supplied with electrical energy either from a battery or from an alternating current generator, and wherein suitable means are provided for charging the battery from said alternating current generator.

In accordance with the illustrated embodiment of my invention, I provide a submarine propulsion system wherein two sources of energy, an alternating current generator and a battery, may be used at different times to drive a variable speed motor of the alternating current type having a plurality of electrically displaced stator winding sections connected to operate in parallel with one another. The motor is energized from either one or the other of the sources of energy through a plurality of electric discharge valves. The alternating current generator is used to supply power to the motor and also to charge the battery during surface operation through suitable electric discharge valves while during submerged operation the battery supplies the driving energy for the motor through electric discharge valves. At reduced speed submerged operation when the counter-electromotive force of the motor is less than the voltage of the battery the alternating current generator is allowed to absorb part of the battery energy which by suitable means is returned to the battery. Two complete power systems including two motors and two generators may be provided as well as means for driving both motors from either one of the sources of energy or driving each motor independently through its own generator.

Figure 2A:
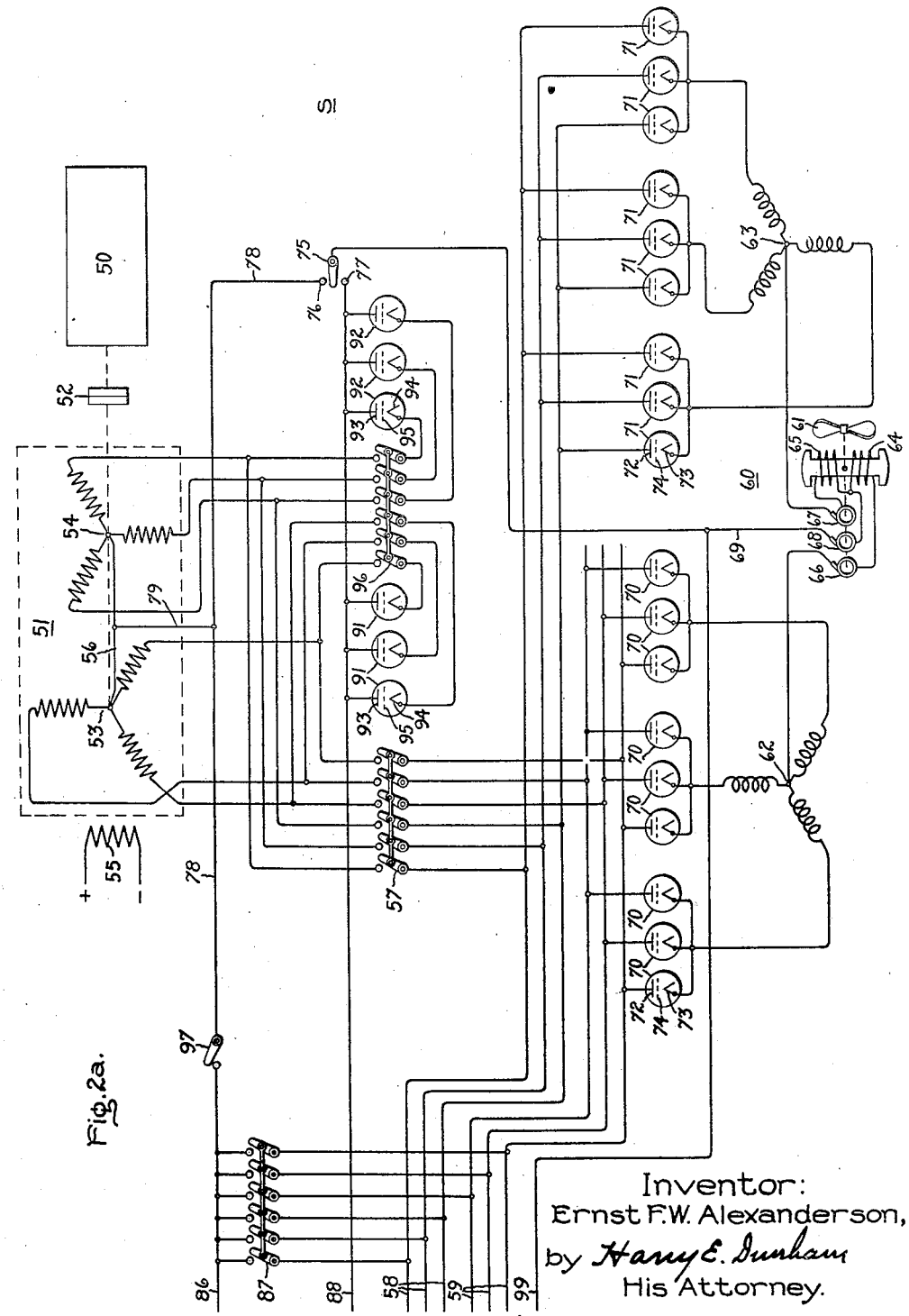
Figure 2B:
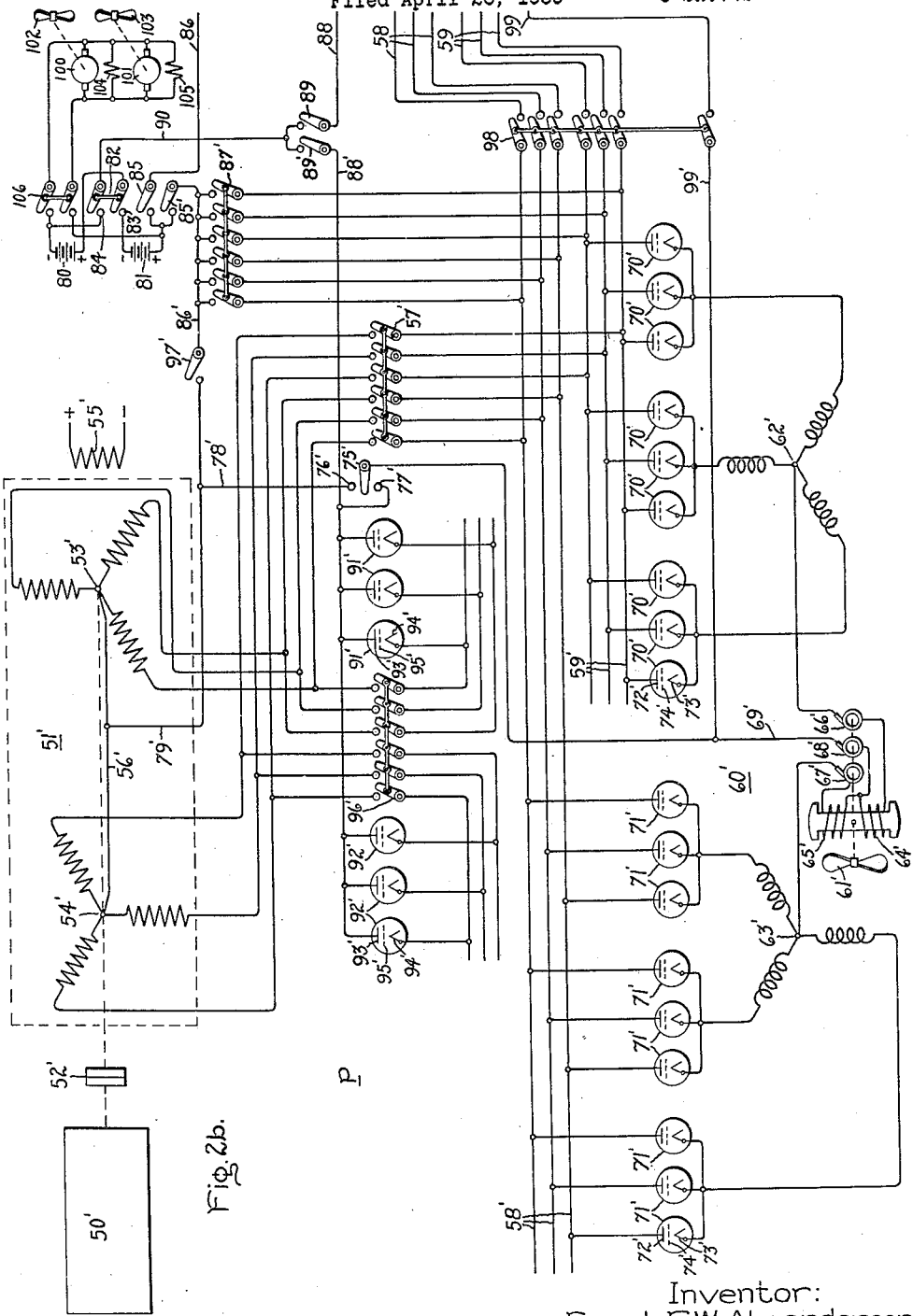

For a better understanding of my invention, reference may be had to the following description taken in connection with the accompanying drawings and its scope will be pointed out in the appended claims. Fig. 1 of the accompanying drawings illustrates diagrammatically an electric power system embodying my invention, while Figs. 2a and 2b are, respectively, a first and second portion of a diagrammatic illustration of my electric power system applied to a submarine having two complete power units.

Referring now to Fig. 1, I have illustrated therein an electric power system comprising a prime mover 10 which may be a steam turbine, an internal combustion engine or any other suitable type of prime mover. Prime mover 10 is adapted to be connected to alternating current generator 11 through coupling means or clutch 12. Generator 11 may be any suitable type of alternator and is diagrammatically shown as being of the three-phase Y-connected type with a field winding 13 supplied from a suitable source of excitation current. Generator 11 has its phase terminals connected to energize a bus 14. A motor 15 is provided for driving the propeller 16 of the submarine. The motor 15 is illustrated as of the alternating current type and comprises two stator or armature winding sections 17 and 18, each comprising phase windings connected in three-phase Y relation and electrically displaced from one another by 180 electrical degrees. A pair of field windings 19 and 20 are provided for electric motor 15. Field winding 19 is connected through slip ring 21 to the neutral of stator winding section 17, while the other terminal of field winding 19 is connected through slip ring 22 to direct current line 23. Field winding 20 is connected through slip ring 24 to the neutral of stator winding section 18, while the other terminal of field winding 20 is connected through slip ring 25 to direct current line 26. Each of the phase terminals of the stator or armature winding sections 17 and 18 is interconnected with each of the phase conductors of generator 11 and bus 14 through electronic means comprising electric discharge valves 27. Each of the electric valves 27 is provided with an anode 28, a cathode 29 and a control electrode or grid 30. The anodes 28 of each of the valves 27 are connected to one of the three phases of bus 14 and so arranged that each phase terminal of stator winding sections 17 and 18 is connected, respectively, with each of the three phases of bus 14. The electric valves 27 may be any of the several types well known in the art, although I prefer to use valves of the vapor electric discharge type.

In the arrangement just described, stator winding section 17 and field winding 19 are connected so as to operate in parallel with stator winding section 18 and field winding 20, each of the parallel branches being supplied with energy through electric discharge valves 27. During surface operation of the submarine direct current line 23 is connected through a suitable switch 31, terminal 32, line 42, terminal 41, switch 40 and line 33 to the neutral of generator 11, while direct current line 26 is connected through a suitable switch 34, terminal 35, line 36, terminal 41, switch 40 and line 33 to the neutral of generator 11. During this time the prime mover 10 is connected by coupling means 12 so as to drive generator 11 which supplies energy to electric motor 15 through electric discharge valves 27. For submerged operation of the submarine, however, it is not possible to operate the prime mover 10 without affording an easy means by which its presence may be detected. Therefore, a source of energy must be provided which will not in any manner disclose the presence of the submarine. For this purpose I provide battery 37 connected in the direct current lines 23 and 26, which supplies the power to electric motor 15 through electric valve means 27 when the prime mover 10 is shut down. Generator 11 is then uncoupled from prime mover 10 by means of clutch 12. Battery 37 is connected to direct current line 26 through switch 34 and terminal 38 and to direct current line 23 through switch 31 and terminal 39. Energy flows from the positive terminal of battery 37 through line 36, terminal 41, switch 40 and line 33 to the neutral of the winding of generator 11. Switch 40 has been provided so that battery 37 may be reversely connected in the direct current circuit for charging purposes. When power is supplied from generator 11 to motor 15 during surface operation the battery may be charged by connecting switch 40 with terminal 43. This forces the direct current to flow through the battery 37 in the reverse direction.

When battery 37 supplies the energy for operating motor 15 to drive the submarine at reduced speed submerged then the counter-electromotive force of motor 15 is less than the voltage of the battery by a factor directly proportional to the speed reduction. Thus at half speed submerged operation only half of the battery voltage is consumed in the motor and it is necessary to dispose of or utilize the excess battery power. For this purpose I propose to let generator 11, which has been uncoupled from prime mover 10, run free as a motor and absorb half of the battery voltage, thus also absorbing half of the battery power. The battery 37 is therefore connected only in one of the circuits which pass through one of the motor winding sections, that is, battery 37 is connected in series with stator winding section 17, field winding 19 and line 23 through switch 31 and terminal 39. Stator winding section 18 and field winding 20, however, are connected in series directly to the neutral of generator 11 through line 26, switch 34, terminal 35, line 36, terminal 41, switch 40 and line 33. This second circuit including stator winding section 18 operates in the same manner as when power is supplied directly from generator 11 by virtue of prime mover 10, that is, energy is drawn from generator 11 and delivered to motor winding 18. During reduced speed submerged operation the generator 11, therefore, will be rotated by energy drawn from the battery even though it is uncoupled from prime mover 10 and operates as a rotary converter taking direct current from the battery and delivering alternating current to one-half of motor 15. If the speed of motor 15 is increased its counter-electromotive force is accordingly increased, while the counter-electromotive force and speed of generator 11 are reduced.

The speed of motor 15 is controlled by the grids or control electrodes 30 of electric discharge valves 27 which control the conductivity of these electric discharge valves. In order to control the conductivities of the electric discharge valves 27 there is provided a separate control system for the groups of valves supplying stator winding section 17 and a second control system for the valves supplying energy to stator winding section 18. The control system for winding section 18 includes a phase shifting device 44 energized from bus 14 and which is arranged to energize a transformer 45 having a primary winding and a Y-connected secondary winding. The secondary winding of transformer 45 supplies energy to a plurality of control transformers 48 the primary windings of which may be provided with suitable shunt resistors. For the purpose of simplicity only sufficient transformers have been shown to control one group of three valves which supply one phase of stator winding section 18. The secondaries of transformers 48 are connected between the cathode and control grid of these valves and this circuit may include a suitable current limiting resistor such as 49. In order that these control transformers 48 be energized in accordance with the speed and position of the field structure of the alternating current motor 15 there is provided on the shaft of the motor a distributor 46 having a plurality of brushes, each brush controlling a group of transformers 48 arranged to control the moments of ignition of a group of three valves. The conducting segment of the distributor 46 is connected by means of a suitable brush (not shown) to the neutral point of the secondary winding of transformer 45 and the outer extremities of the proper phase windings are connected in series through the primary winding of the transformers 48 through a plurality of unilateral conductive devices 47 to one of the distributing brushes of the distributor 46. A similar control system is provided for the valves supplying stator winding section 17 so that each half of motor 15 may under certain conditions be separately controlled. The single distributor 46 serves to control both halves of motor 15 but duplicate elements having primed similar reference numerals for the corresponding parts are provided to control the valves supplying stator winding section 17. Again for simplicity only the control circuit for one group of three valves is shown. While the control system shown is similar to that disclosed and claimed in United States Letters Patent No. 1,971,833 granted August 28, 1934, upon the application of Earl L. Phillipi for Electric valve converting system and excitation apparatus therefor, and which is assigned to the same assignee as the present application, any other suitable control system may be utilized in order to render conductive the various valves in the proper sequence so that the phase windings of stator winding sections 17 and 18 may become energized in proper sequence in accordance with the speed of the motor 15. By advancing or retarding the time at which control electrodes 30 are energized the flow of energy to the motor may be controlled in a manner very analogous to the throttle control of a steam engine.

The operation of the arrangement shown in Fig. 1 will be explained in connection with the various operating conditions of the propulsion system. For surface operation of the submarine the prime mover 10 is coupled to generator 11 through clutch 12 thus energizing bus 14 with three phase alternating current potential. Switches 31 and 34 are moved to the lower position making contact with terminals 32 and 35, respectively, and switch 40 is moved to the right contacting terminal 41. Power then flows from bus 14 through electric discharge valves 27 to windings 17 and 18 in parallel, then through field windings 19 and 20, through direct current lines 23 and 26 through switches 31 and 34, thence back to the neutral of generator 11 through switch 40 and line 33. The speed of operation of electric motor 15 during surface operation is controlled by grids 30 of electric valves 27. By suitably positioning phase shifters 44 and 44' as is well known by those skilled in the art, the phase of the grid excitation of valves 27 may be retarded with respect to the alternating potentials impressed on the anodes 28 and then the power supplied to motor 15 is decreased and likewise the speed is reduced. Conversely, as the phase of the grid excitation is advanced with respect to the potentials impressed upon the anodes 28 of electric valves 27, then the speed of the electric motor 15 is increased. If it is desired to charge the battery 37 switch 40 is moved to the left so as to make contact with terminal 43. The remainder of the connections are the same as for surface operation of the submarine when the battery is not being charged. By moving switch 40 to the left to contact terminal 43 battery 37 is inserted in the direct current circuit and rectified current generated by generator 11 flows in direct current lines 23 and 26 from field windings 19 and 20, and thence through battery 37 in the reverse direction.

For high speed submerged operation battery 37 is connected in the direct current circuit by moving switches 31 and 34 to the upward position making contact with terminals 39 and 38, respectively. Prime mover 10 is shut down and uncoupled from generator 11 by means of clutch 12. Switch 40 is moved to the right so as to contact terminal 41 and energy then flows from the positive terminal of battery 37 through line 36, contact 41, switch 40, line 33, to the neutral of generator 11. From there the energy passes through the generator windings to bus 14 then through electric discharge valves 27, through the stator and field windings of motor 15 through direct current lines 23 and 26, back to the negative terminal of battery 37, through switches 31 and 34 and terminals 39 and 38, respectively. The current is commutated from one group of electric valves to another by virtue of the counter-electromotive force of motor 15. Speed control in this case is obtained by shifting the brushes on distributor 46 similar to brush shifting in a direct current dynamo-electric machine.

For low speed submerged operation of the submarine the circuit connections are the same as for high speed submerged operation just described, except that switch 34 is moved to the lower position so as to contact terminal 35. Switch 31 remains in the upper position while switch 40 remains contacting terminal 41 in the right-hand position. The energy flow from bus 14 through electric valves 27 and motor 15 to lines 23 and 26 is the same in all of the different operating conditions described. However, for low speed or reduced speed submerged operation current flows through direct current line 26, switch 34, terminal 35, line 36, terminal 41, switch 40, and line 33, directly back to the neutral of generator 11. In line 23, on the other hand, current flows through switch 31, contact 39, to the negative terminal of battery 37 and thence from the positive terminal of battery 37 to the neutral of generator 11 through line 36, terminal 41, switch 40 and line 33. Hence during low speed submerged operation generator 11 runs free from prime mover 12 and absorbs a portion of the battery voltage, that is, that portion of the battery voltage which exceeds the counter-electromotive force of motor 15. By absorbing this excess of the battery voltage generator 11 also absorbs a corresponding amount of excess battery energy which is supplied to stator winding section 18 of motor 15 and returns to the neutral of generator 11 without passing through battery 37. Stator winding section 17 on the other hand is connected in series with battery 37 and receives energy directly therefrom. Thus generator 11 runs free at a speed dependent upon the power absorbed from battery 37. The greater the speed of motor 15 the greater the counter-electromotive force thereof and the lower the counter-electromotive force of generator 11 now operating as a motor. Generator 11 thus acts as a motor generator analogously to the Ward-Leonard control by regulating the speed of motor 15. Furthermore, only a very small amount of energy is used to supply the light running losses of generator 11. For the operation just described motor 15 may be speeded up until it consumes the full electromotive force of the battery, at which time switch 34 is moved to the upward position so as to contact terminal 38 whereby the battery 37 is included in the circuit of both stator winding sections 17 and 18 of motor 15. For reduced speed submerged operation generator 11 acts as a variable impedance or variable reactance absorbing excess battery voltage and supplying one-half of motor 15 with alternating current while the other half is supplied only from battery 37. By means of phase shifter 44 the speed of motor 15 may be controlled by controlling the moment of excitation of the valves 27 supplying stator winding 18. The energy supplied to stator winding section 17 during this time may be controlled to a limited extent by shifting the brushes on distributor 46.

In Figs. 2a and 2b I have shown diagrammatically a general assembly of the apparatus and the electrical connections for carrying out my invention in a two-motor propulsion system having duplicate power plants, motors and propellers. For ease of identification the power system shown in Fig. 2b will be designated by P, to indicate the port motor power system, while the arrangement shown in Fig. 2a will be designated S to indicate the starboard motor power supply system. Similar parts of the port motor power system will be designated by the same reference numerals marked with a prime as the corresponding parts of the starboard motor power system. It will be understood that Figs. 2a and 2b together form a complete illustrative diagram of my invention as applied to a two motor submarine propulsion system.

Referring now to the starboard motor power system S, I have shown a system including a prime mover 50 adapted to be connected to drive generator 51 through clutch or coupling member 52. Prime mover 50 may be any of the well known prime movers such as a steam turbine, Diesel engine or other form of internal combustion engine. Generator 51 is illustrated as a double winding generator having two three phase Y-connected windings 53 and 54 electrically displaced in phase from one another by 180 electrical degrees. A field winding 55 for generator 51 is energized from a suitable source of power (not shown). The phase windings 53 and 54 of generator 51 have their neutrals connected by line 56. Electrical energy generated in the phase windings 54 and 53 of generator 51 is supplied to busses 58 and 59, respectively, through a six-pole switch 57. A motor 60 is provided for driving the starboard propeller 61 of the submarine. This motor 60 is illustrated as of the alternating current type and comprises two stator winding sections 62 and 63, each comprising three phase windings connected in Y relation and electrically displaced from one another by 180 electrical degrees. A pair of field windings 64 and 65 are provided for electric motor 60. Field winding 64 is connected through slip ring 66 to the neutral of stator winding section 62 while field winding 65 is connected through slip ring 67 to the neutral of stator winding 63. The other terminals of field windings 64 and 65 are connected together to direct current line 69 through slip ring 68. Each of the phase terminals of the stator winding section 62 is interconnected with each of the phases of bus 59 and generator winding 53 of generator 51 through electric discharge valves 70 while each of the phase terminals of the stator winding section 63 is interconnected with each of the phases of bus 58 and winding 54 of generator 51 through electric discharge valves 71. The electric valves 70 and 71 are each provided with an anode 72, a cathode 73 and a control electrode or grid 74. The anodes of each of the electric valves 70 are connected to one of the three-phases of bus 59 while the cathodes 73 are connected to the respective phases of stator winding section 62.

The anodes 72 of each of the electric valves 71 are connected to one of the three phases of bus 58, while the cathodes are connected respectively to the various phases of stator winding section 63. Electric valves 70 and 71 may be any of the several types well known in the art, although I prefer to use tubes of the vapor electric type. In the arrangement just described winding 53 of generator 51, electric valves 70 and stator winding section 62 are connected so as to operate in parallel with winding 54 of generator 51, electric discharge valves 71 and stator winding section 63.

Direct current line 69 is connected to a single pole double throw switch 75 adapted in the upper position to contact terminal 76 and in the lower position terminal 77. Terminal 76 is connected through line 78 and line 79 to the neutrals of windings 53 and 54 of generator 51 through line 56. The port motor 60' driving propeller 61' shown in Fig. 2b is supplied with energy from generator 51' in the same manner as the starboard motor 60 just described. The electric power system including prime movers 50 and 50', generators 51 and 51', and motors 60 and 60' are used to drive the submarine during surface operation.

For submerged operation I provide batteries 80 and 81, Fig. 2b, which are connected in series by means of double pole single throw switch 82 making contact with terminals 83 and 84. The negative terminal of battery 81 is connected through terminal 83 and switch 82 to the positive terminal of battery 80. For full speed submerged operation of the submarine batteries 80 and 81 are connected to supply energy directly to motors 60 or 60' through single pole single throw switches 85 or 85', respectively. The positive terminal of battery 81 is connected through switch 85 to direct current line 86. From direct current line 86 battery power is supplied through six pole switch 87 to busses 58 and 59, respectively, and from thence through electric discharge valves 70 and 71 to stator winding sections 62 and 63, respectively. The return circuit from motor 60 comprises line 69, single pole switch 75, terminal 77, line 88, switch 89, line 90, switch 82 and contact 84, back to the negative terminal of battery 80, which is connected in series with battery 81 through switch 82.

In order to charge batteries 80 and 81 from generator 51 I have provided electric discharge valves 91 and 92, each comprising anodes 93, cathodes 94 and control electrodes or grids 95. The anodes 93 of electric discharge valves 91 and 92 are connected directly to line 88. The cathodes 94 of electric valves 91 and 92 are connected to the phase windings 53 and 54, respectively, of generator 51 through a six-pole switch 96. The charging circuit for batteries 80 and 81 is arranged so that direct current flows from line 86 through switch 85 to the positive terminal of battery 81 and from the negative terminal of battery 81 through terminal 83 and switch 82 to the positive terminal of battery 80. From the negative terminal of battery 80 current flows through terminal 84, switch 82, line 90, switch 89, line 88 to anodes 93 of electric discharge valves 91 and 92 and from there through switch 96 to windings 53 and 54 of generator 51. The neutrals of windings 53 and 54 of generator 51 are connected through lines 56, 79 and 78 through switch 97 back to line 86. In addition to providing a charging circuit for batteries 80 and 81, electric discharge valves 91 and 92 serve another purpose, that is, they automatically serve to regulate the speed of the generator 51 during submerged operation of the submarine when it is uncoupled from prime mover 50 and is running free as a motor to absorb part of the battery energy when the counter-electromotive force of motor 60 is less than the battery voltage. Thus battery charging tubes 91 and 92 always serve as a link between generator 51 and batteries 80 and 81. The function of electric valves 91 and 92 will be described in greater detail when the operation of the submarine propulsion system is described. In order to operate motors 60 and 60' from either one of generators 51 or 51' I have provided a seven-pole switch 98 which interconnects busses 58 and 58', busses 59 and 59' and lines 99 and 99', the latter line interconnecting the direct current lines 69 and 69'.

For very slow speed submerged operation of the submarine I have provided direct current creeping motors 100 and 101 connected to drive creeping propellers 102 and 103, respectively. These direct current motors 100 and 101 have shunt field windings 104 and 105, respectively. Energy is supplied to motors 100 and 101 from batteries 80 and 81 through double pole switch 106.

The apparatus and connections making up the power system for the port motor shown in Fig. 2b are identical with the apparatus and connections described for the starboard motor and hence will not be described in detail. When both prime movers 50 and 50' are running the two sides of the submarine, namely, the port and starboard motors, may be operated entirely independently from one another. This eliminates any difficulty of synchronous operation by the port and starboard electric power systems. Also it is possible to cruise with a single prime mover 50 or 50' supplying energy to both port and starboard motors 60 and 60' by connecting together busbars 58, 59 and 58', 59', respectively. The starboard and port motors 60 and 60' will each be provided with a distributor and grid control circuit which may be similar to that shown in Fig. 1, but these circuits have not been shown in order to keep the illustration of the power circuits as simple as possible.

The operation of the illustrated embodiment of my invention as shown in Figs. 2a and 2b will be described in connection with the different operating conditions of the submarine. During surface operation of the submarine with both prime movers 50 and 50' supplying the energy of propulsion switches 57 and 57' are closed and switches 75 and 75' are moved to the upper position so as to contact terminals 76 and 76'. Prime movers 50 and 50' are coupled to generators 51 and 51' through coupling means 52 and 52', respectively. Energy will then flow from the generator windings 53 and 54 of generator 51 through switch 57 to busses 58 and 59. From the busses 58 and 59 electrical energy is supplied to winding sections 62 and 63 of starboard motor 60 through electric discharge valves 70 and 71. The field windings 64 and 65 will be supplied with direct current from stator winding sections 62 and 63 and the return circuit to generator 51 from field windings 64 and 65 comprises slip ring 66, line 69, switch 75, contact 76, lines 78, 79 and 56 to the neutrals of windings 53 and 54 of generator 51. The flow of energy in the electric power system for the port motor will follow the same course in its corresponding circuits as the power flow just described for the starboard motor. Speed control of starboard and port motors 60 and 60', respectively, will be obtained through control electrodes 74 and 74' of electric discharge valves 70, 70' and 71, 71', as is well known by those skilled in the art, similar to that described for Fig. 1.

When it is desired to propel the submarine on the surface with only one of the prime movers supplying the energy, for example, the starboard prime mover 50, the switches 57 and 98 are moved to the closed position and switch 75 is moved to the upper position contacting terminal 76. The flow of energy will be the same as that just described when both prime movers are supplying the power for driving the submarine motors, except that electric discharge valves 70' and 71' are energized from busses 58 and 59 connected through switch 98 to busses 58' and 59'. Line 69' is also connected to switch 75 through lines 99', switch 98 and line 99. Speed control of the submarine motors when propelled on the surface of the water with prime mover 50 alone supplying the energy is obtained by controlling the energization of control electrodes 74 and 74' of the electric discharge valves supplying energy to motors 60 and 60'. It will, of course, be understood that if port prime mover 50' is operating and starboard prime mover 50 is shut down the system will operate in the same manner as that just described. In the latter case, of course, switch 57' will be closed and switch 75' will be moved to the upper position contacting terminal 76'. As before switch 98 will be moved to the closed position.

If it is desired to charge batteries 80 and 81 from both generators 51 and 51' when the submarine propulsion motors 60 and 60' are not operating, the following connections are made: switches 96 and 96', 89 and 89', 82, 85 and 85', 97 and 97' are moved to the closed position. Prime movers 50 and 50' will be drivingly coupled to generators 51 and 51', respectively, through coupling members 52 and 52'. Direct current will flow through switches 97 and 97', lines 86 and 86' and switches 85 and 85' to the positive terminal of battery 81 which is in series with battery 80 and from the negative terminal of battery 80 through contact 84 and switch 82 to line 90. From here the charging current divides and half of it flows through switch 89, line 88, to the anode 93 of electric discharge valves 91 and 92 and from there to the cathodes 94 of electric discharge valves 91 and 92 through switch 96 to windings 53 and 54 of generator 51 and back to switch 97 through the neutrals of generator windings 53 and 54. The other half of the charging current is returned in the same manner through discharge valves 91' and 92', windings 53' and 54' of generator 51' and back to switch 97'. It will be understood by those skilled in the art that the charging current will flow only during the negative half cycles of alternating potential generated by the respective windings of generators 51 and 51'. The charging current for the batteries 80 and 81 will be controlled by the control electrodes 95 and 95' of the battery charging tubes 91, 91' and 92, 92', as is well known by those skilled in the art.

When it is desired to charge batteries 80 and 81 with a single generator operating, for example, the starboard generator 51, it is necessary to move switches 96, 89, 82, 85 and 97 to the closed position. The flow of power in this case will be the same as when both generators are operating except that all the charging current will be supplied from a single generator. By closing switches designated with the corresponding primed reference numerals batteries 80 and 81 may be charged with only the port generator 51' operating. In this arrangement the charging current will be controlled through control electrodes 95' of electric discharge valves 91' and 92' as is well known to those skilled in the art.

When it is desired to propel the submarine upon the surface of the water and charge the batteries at the same time with both the port and starboard generators operating it will be necessary to move the following switches to the closed position: 57, 57'; 96, 96'; 82, 85, 85'; 97, 97'; also switches 75 and 75' must be moved to the upward position to contact terminals 76 and 76', respectively. The flow of energy in this case will be the same as that described for surface propulsion with both prime movers operating and for battery charging only with both prime movers operating. The speed of motors 60 and 60' will be controlled by control electrodes 74 and 74' of electric discharge valves 70, 71 and 70', 71', respectively, as is well known by those skilled in the art. Control of the charging current, on the other hand, will be obtained through control electrodes 95 and 95' of electric discharge valves 91, 92 and 91', 92', respectively. It will be quite obvious to those skilled in the art that it will be possible to propel the submarine along the surface and charge the batteries with either one of the prime movers 50 or 50' supplying the necessary energy for driving the propulsion motors. In this case, if prime mover 50 is operating and prime mover 50' is shut down, it will be necessary to close switches 57, 98, 96, 89, 82, 85 and 97 as well as to move switch 75 to the upward position contacting terminal 76. It will also be obvious to those skilled in the art that with the illustrated embodiment of my invention it is possible to propel the submarine on the surface with one generator driving both motors, for example, the starboard generator, and charge batteries 80 and 81 with the other generator, namely, the port generator. In this case switches 57, 98, 96', 89', 82, 85' and 97' are closed and switch 75 is moved to the upward position contacting terminal 76. The control of the speed of electric motors 60 and 60' will be obtained by virtue of the control electrodes 74 of electric discharge valves 70 and 71 and the corresponding valves control electrodes 74' of the port motor 60', while the charging current for batteries 80 and 81 is controlled by control electrodes 93' of electric discharge valves 91' and 92', as is well known by those skilled in the art.

For full speed submerged operation of the submarine with both port and starboard motors operating the following switches will be moved to the closed position: 89, 89', 82, 85, 85', 87 and 87'. Also switches 75 and 75' will be moved to the lower position contacting terminals 77 and 77', respectively. In this case, energy will be supplied from batteries 80 and 81 through switches 85 and 85', switches 87 and 87' to motor busses 58, 59 and 58', 59'. From here the direct current energy will be supplied through electric discharge valves 70, 71, 70', 71' to periodically energize the windings of starboard and port motors 60 and 60', respectively. The return connections for these motors to batteries 80 and 81 comprise lines 69, switch 75, contact 77, line 88, switch 89, switch 82, to the negative terminal of battery 80 and also the corresponding primed reference numerals of the port power system. Speed control in this case may be obtained by shifting the brushes on the motor distributor (not shown).

For reduced speed submerged operation of the submarine, generators 51 and 51' are uncoupled from their respective prime movers 50 and 50' and run free as motors absorbing any excess battery power which is not used by port and starboard motors 60 and 60'. This energy is returned to the batteries through electric discharge valves 91, 92 and 91', 92'. In this arrangement switches 89, 89', 82, 85, 85', 97, 97', 96, 96', 57 and 57' are moved to the closed position while switches 75 and 75' are moved to the downward position contacting terminals 77 and 77'. By this arrangement both generators 51 and 51' will be allowed to absorb excess battery voltage and energy will flow from the positive terminal of battery 81 through switches 85 and 85', 97 and 97' to the neutrals of the windings of generators 51 and 51', respectively. This energy will be transmitted from generator windings 53, 54 and 53', 54' through switches 57 and 57' to electric motors 60 and 60' through the respective discharge valves 70, 71 and 70', 71'. The return connections from motors 60, 60' comprise lines 69, 69', switches 75, 75', terminals 77, 77', back to the negative terminal of battery 80 through switches 89, 89', respectively. A portion of the excess energy, however, flows from terminals 77, 77' to the anodes 93, 93' of electric discharge valves 91, 92 and 91', 92', respectively. From here it is returned through the windings of generators 51, 51', lines 56, 56', 79, 79', switches 97, 97', lines 86, 86' and switches 85 and 85' to the positive terminal of battery 81. It will, of course, be obvious to those skilled in the art that variable speed submerged propulsion of the submarine may be obtained with only a single generator, for example, the starboard generator 51, absorbing the excess energy by motor action and returning it to the battery.

When it is desired to propel the submarine submerged at a very low speed the creeping motors 100 and 101 drive the submarine by means of propellers 102 and 103. In this case switches 82 and 106 are closed and speed control may be obtained by controlling the motor fields 104 and 105.

While I have shown and described particular embodiments of my invention, it will be obvious to those skilled in the art that various changes or modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. In an electric power system, a source of electrical energy, an electric motor having a field winding and a plurality of electrically displaced stator winding sections each having a plurality of phase terminals, electronic means including a plurality of electric discharge valves each provided with an anode, a cathode and a control electrode, all of said anodes being connected with said source of electrical energy while said cathodes are connected to one of said plurality of phase terminals, and means for selectively completing a circuit between said source and said winding sections so that energy may be transmitted to said plurality of stator winding sections in parallel or individually.

2. In an electric power system, a source of electrical energy, an electric motor having a plurality of electrically displaced stator winding sections each comprising a plurality of Y-connected phase windings including a neutral terminal, a field winding interconnecting said neutral terminals, means including a plurality of electric discharge paths for interconnecting said source of electrical energy with each of said phase windings and so connected that energy flows toward the neutral terminals in all of the stator winding sections and means for selectively completing a circuit between said source and one of said stator winding sections.

3. In an electric power system, an alternating current generator including a winding, a motor of the alternating current type having a stator winding comprising a plurality of winding sections electrically displaced from one another, a divided rotor winding for said motor interconnecting said winding sections, electronic means including a plurality of electric discharge valves for connecting said plurality of winding sections for energization in parallel relation from said generator winding, and means for connecting only one of said stator winding sections and a portion of said rotor winding to said generator winding.

4. In an electric power system, a prime mover, an alternating current generator, coupling means for drivingly connecting said prime mover to said generator, said generator including a winding provided with a plurality of phase terminals and a neutral terminal, a motor of the alternating current type having a stator winding comprising a plurality of winding sections electrically displaced from one another, a plurality of motor rotor windings each connected in series with one of said winding sections, electric valve means for interconnecting said phase terminals of said generator with each of said stator winding sections, and means for connecting each of said rotor windings to said neutral terminal of said generator winding so that parallel operation of said winding sections is obtained.

5. In an electric power system, the combination of a plurality of sources of different forms of electric current, a variable speed motor of the alternating current type having a plurality of stator winding sections, a field winding interconnecting said winding sections, a plurality of electric discharge valves adapted to connect said sources of electric energy with each of said stator winding sections, and means for connecting either one of said sources of electrical energy with either one of said winding sections.

6. In an electric power system, the combination of a plurality of sources of electrical energy, a variable speed motor of the alternating current type having a plurality of stator winding sections electrically displaced from one another and arranged to be energized in parallel, a field winding interconnecting said winding sections, a plurality of electric discharge valves arranged for connecting said sources of electrical energy with each of said stator winding sections and means for selectively connecting either one of said sources of electrical energy with either of said winding sections.

7. In an electric ship propulsion system the combination of a prime mover, a generator, coupling means for drivingly connecting said prime mover to said generator, a second source of electrical energy comprising a battery, a motor of the alternating current type having a stator winding comprising a plurality of winding sections electrically displaced from one another and a rotor winding comprising a plurality of sections, each section being connected for energization in series with one of said stator winding sections, a power supply bus, a plurality of electric discharge valves for connecting said stator winding sections in parallel relation to said supply bus, and means for energizing said supply bus either from said generator or from said battery.

8. In a submarine propulsion system the combination of a power bus, a prime mover, an alternating current generator, coupling means for drivingly connecting said prime mover to said generator for energizing said power bus during surface operation, a battery for energizing said power bus during submerged operation, a motor of the alternating current type having a rotor winding and a stator winding comprising a plurality of winding sections electrically displaced from one another, a plurality of electric discharge valves interconnecting said power bus and said winding sections for energizing said motor from said alternating current generator during surface operation and from said battery during submerged operation and means including said generator for absorbing a portion of said battery energy and returning it to said battery during reduced speed submerged operation.

9. In an electric power system, a prime mover, an alternating current generator having a winding provided with a plurality of phase terminals and a neutral terminal, coupling means for drivingly connecting said generator with said prime mover, a motor of the alternating current type having a stator winding comprising a plurality of winding sections each provided with a neutral terminal, a rotor winding connected in series with each of said winding sections, each of said rotor windings being connected to said neutral terminal of said generator winding, electric valve means for interconnecting said phase terminals of said winding sections so that electrical energy is transmitted from said generator to said motor, a battery for supplying energy to said motor through said electric valve means when said generator is uncoupled from said prime mover, and means for supplying one of said stator winding sections from said battery while another of said winding sections is energized from said uncoupled generator drawing energy from said battery.

10. In an electric power system, a prime mover, an alternating current generator having a winding provided with a plurality of phase terminals and a neutral terminal, coupling means for drivingly connecting said generator with said prime mover during one condition of operation, a motor of the alternating current type having a stator winding comprising a plurality of winding sections each provided with a neutral terminal, a rotor winding connected in series with each of said winding sections, each of said rotor windings being connected to said neutral terminal of said generator winding, electric valve means for interconnecting said phase terminals and said winding sections whereby electrical energy is transmitted from said generator to said motor during said one condition of operation, a battery, means for charging said battery from said generator during said one condition of operation, means for energizing said motor through said electric valve means from said battery during a second condition of operation when said generator is uncoupled from said prime mover, and means for supplying one of said stator winding sections from said battery while another of said winding sections is supplied from said uncoupled generator drawing energy from said battery during a reduced speed phase of said second condition of operation.

11. In an electric power system comprising in combination a prime mover, a generator, coupling means for drivingly connecting said prime mover to said generator, a second source of electrical energy comprising a battery, a motor of the alternating current type having a stator winding comprising a plurality of winding sections and a rotor winding comprising a plurality of sections, each section being arranged for energization in series with one of said stator winding sections, a power supply bus, a plurality of electric discharge valves interconnecting said supply bus and said stator winding sections, and means for energizing said supply bus either from said generator or from said battery, and means for charging said battery from said generator.

12. The method of operating an electric power system comprising a prime mover, a generator, coupling means for drivingly connecting said prime mover with said generator, a battery, and a motor, which comprises energizing said motor from said generator for one mode of operation, uncoupling said prime mover from said generator and energizing said motor from said battery for a second mode of operation and energizing said motor from said battery during a third mode of operation and utilizing said generator uncoupled from said prime mover to absorb any excess battery energy and return it to the battery.

13. In an electric power system, the combination of a plurality of sources of electrical energy, a plurality of electric discharge valves, an electric motor having a stator winding and a field winding, means for selectively energizing said stator and field windings from either of said sources of electrical energy through said electric discharge valves, and means for supplying energy from one of said sources simultaneously to said electric motor and to a second of said sources of electrical energy.

14. In a submarine propulsion system the combination of an electric motor, a plurality of electric discharge valves, a plurality of sources of electrical energy, one of which supplies power during surface operation while another supplies power during submerged operation, means for energizing said motor through said electric valves from either of said sources of electrical energy, and a second group of electric discharge valves for providing a return path to one of said sources for any excess energy supplied by it to said electric motor.

15. In an electric power system, a prime mover, a generator having a winding provided with a plurality of phase terminals and a neutral terminal, coupling means for drivingly connecting said prime mover with said generator, a power bus, a plurality of electric discharge valves, a motor of the alternating current type having a plurality of stator windings and a rotor winding arranged for energization from said power bus, through said plurality of electric discharge valves, a battery for energizing said bus when said generator is uncoupled from said prime mover, and a second set of electric valves connected in a charging circuit for said battery for connecting said generator to supply energy both to said supply bus and to said battery charging circuit.

16. In an electric power system, a prime mover, a generator having a winding provided with a plurality of phase terminals and a neutral terminal, coupling means for drivingly connecting said prime mover with said generator, a power bus, a plurality of electric discharge valves, a motor of the alternating current type having a plurality of stator windings and a rotor winding arranged for energization from said power bus through said plurality of electric discharge valves, a battery for energizing said bus when said generator is uncoupled from said prime mover, and a second set of electric valves connected in a charging circuit for said battery and serving both to connect said generator to supply energy to said battery charging circuit and also automatically to regulate the speed of said generator when uncoupled from said prime mover.

17. The method of operating a power system comprising a battery and duplicate power plants each of which includes a prime mover and an alternating current generator driven thereby, a motor, and electronic means for controlling the energization of said motor which comprises energizing each of said motors directly from one of said generators for one mode of operation, energizing both of said motors from said battery for another mode of operation, energizing said motors from said batteries and utilizing said generators to absorb any excess battery energy for a third mode of operation, and operating said motors from one or the other of said generators for a fourth mode of operation.

18. In an electric power system, a prime mover, a generator having a winding provided with a plurality of phase terminals and a neutral terminal, coupling means for drivingly connecting said prime mover with said generator, a power bus, a plurality of electric discharge valves, a motor of the alternating current type having a plurality of stator windings and a rotor winding and arranged for energization from said bus through said plurality of electric discharge valves, a battery for energizing said bus when said generator is uncoupled from said prime mover, and means including said generator for returning any excess battery energy to said battery when it is supplying energy to said motor.

19. In combination, a source of unidirectional current, an alternating current type of dynamo-electric machine comprising a polyphase armature winding having a neutral terminal, a polyphase bus provided with a neutral terminal, a group of similarly connected electric valves interconnecting each of the phase terminals of said dynamo-electric machine and each phase conductor of said bus, means for connecting said source to said neutral terminals, means for controlling the conductivity of said valves to effect sequential energization of different phase windings of said armature winding from said source, and dynamo-electric means interposed between said source and said bus for maintaining a predetermined relation between the induced voltage of said dynamo-electric machine and the voltage applied to said electric valve means.

20. In combination, a source of unidirectional current having a substantially fixed voltage, an electric motor of the alternating current type having a plurality of phase windings and having electric valve means connected and controlled for sequentially energizing said windings and wherein commutation of current from the electric valves of one terminal of a given phase winding of said motor to another is effected by a periodic reduction of the voltage applied to said electric valve means below a predetermined value, and dynamo-electric means interposed between said source and said electric valve means for maintaining the voltage of said electric valve means at a value such that commutation of current between electric valve means is effected by the counter-electromotive force of said motor winding.

21. In an electric power system, an electric motor provided with a plurality of phase windings, a source of direct current of substantially fixed voltage, means for energizing said motor from said source comprising electric valves associated with each phase of said machine, a dynamo-electric machine connected between said source and said valves for absorbing variable amounts of energy from said source, and means for completing a circuit to receive the absorbed energy from said machine.

22. The combination of a source of direct current of substantially fixed voltage, a power bus, an electric motor of the alternating current type having a plurality of phase windings and having electric valve means connected for controlling and sequentially energizing said phase windings, and a variable impedance means connected between said source and said electric valve means for absorbing variable amounts of energy from said source and supplying it to said bus so that the speed of said motor may be controlled with substantially no waste of electrical energy.

23. In an electric power system, a source of direct current of substantially fixed voltage, an electric motor of the alternating current type having a plurality of stator winding sections, electrically displaced from one another each including a plurality of phase windings, electric valve means connected for controlling and sequentially energizing said phase windings, and a dynamo-electric machine connected between said source and said electric valve means and cooperating therewith to convert a portion of the direct current from said direct current source to alternating current to energize one of said stator winding sections.

24. The combination of a source of direct current of substantially fixed voltage, an electric motor of the alternating current type having a plurality of stator winding sections each including a plurality of phase windings and having electric valve means connected for controlling and sequentially energizing each of said stator winding sections, a dynamo-electric machine interposed between said source and said electric motor for converting a portion of the direct current from said source to alternating current, means for energizing one of said stator winding sections with alternating current from said dynamo-electric machine, and control means for controlling the operation of the electric valves associated with said stator winding section supplied with alternating current from said dynamo-electric machine for controlling the speed of said electric motor.

25. In an electric power system, a source of direct current of substantially fixed voltage, an electric motor of the alternating current type having a plurality of stator winding sections each including a plurality of phase windings, electric valve means connected for controlling and sequentially energizing each of said stator winding sections, a dynamo-electric machine connected between said source and said electric motor for supplying one of said stator winding sections with alternating current through said electric valve means while another of said stator winding sections is supplied with energy from said direct current source through said electric valve means, a separate control means for the plurality of electric valves associated with each of said different stator winding sections, and means for controlling the speed of said motor from one of said control means.

26. In an electric power system an electric motor provided with a plurality of stator winding sections electrically displaced from one another, a source of direct current of substantially fixed voltage, means for energizing said motor from said source comprising a plurality of electric valves associated with each of said stator winding sections, a dynamo-electric machine connected between said source and said valves to convert a portion of said direct current to alternating current which is supplied to one of said stator winding sections, and separate control means for the plurality of electric valves associated with each of said different stator winding sections whereby the operating conditions of said motor may be controlled from one of said control means.

27. In an electric power system the combination of a source of direct current of substantially fixed voltage, an electric motor of the alternating current type having a pair of electrically displaced stator winding sections and a pair of field windings each of said field windings being connected in series with one of said stator winding sections, a plurality of electric valves associated with each of said stator winding sections for controlling and sequentially energizing said stator winding sections, a dynamo-electric machine interposed between said direct current source and said electric motor, means for connecting said direct current source in series with one of said stator winding sections and for connecting the other of said stator winding sections in a circuit excluding said direct current source.

ERNST F. W. ALEXANDERSON.